(12) United States Patent
Ronk et al.

(10) Patent No.: US 7,588,133 B2
(45) Date of Patent: *Sep. 15, 2009

(54) CLUTCH CONTROL SYSTEM FOR POWER TRANSMISSION DEVICES

(75) Inventors: Aaron Ronk, Lake George, NY (US); John D. Zalewski, Liverpool, NY (US); James S. Brissenden, Baldwinsville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 425 days.

This patent is subject to a terminal disclaimer.

(21) Appl. No.: 11/507,315

(22) Filed: Aug. 21, 2006

(65) Prior Publication Data

US 2006/0278492 A1    Dec. 14, 2006

Related U.S. Application Data

(63) Continuation of application No. 10/931,590, filed on Sep. 1, 2004, now Pat. No. 7,097,019.

(51) Int. Cl.
*F16D 25/12* (2006.01)
*F15B 7/06* (2006.01)

(52) U.S. Cl. ............... 192/85 C; 60/545; 192/84.2; 192/85 R

(58) Field of Classification Search ............... None
See application file for complete search history.

(56) References Cited

U.S. PATENT DOCUMENTS

| | | | |
|---|---|---|---|
| 4,862,769 A | 9/1989 | Koga et al. | |
| 4,895,236 A | 1/1990 | Sakakibara et al. | |
| 5,224,906 A | 7/1993 | Sturm | |
| 5,323,871 A | 6/1994 | Wilson et al. | |
| 5,332,060 A | 7/1994 | Sperduti et al. | |
| 5,407,024 A | 4/1995 | Watson et al. | |
| 6,145,644 A | 11/2000 | Mohan et al. | |
| 6,354,977 B1 | 3/2002 | Brown et al. | |
| 6,446,774 B2 | 9/2002 | Porter | |
| 6,484,857 B2 | 11/2002 | Vonnegut et al. | |
| 6,578,654 B2 | 6/2003 | Porter | |
| 6,595,338 B2 | 7/2003 | Bansbach et al. | |
| 6,612,957 B2 | 9/2003 | Bansbach et al. | |
| 6,655,138 B2 | 12/2003 | Shaw et al. | |
| 6,679,565 B2 | 1/2004 | Riddiford | |
| 6,725,990 B2 | 4/2004 | Bowen | |

(Continued)

FOREIGN PATENT DOCUMENTS

FR    2 566 492 A1    12/1985

(Continued)

*Primary Examiner*—Rodney H Bonck
(74) *Attorney, Agent, or Firm*—Harness, Dickey & Pierce, P.L.C.

(57) ABSTRACT

A power transmission device includes a rotary input member receiving drive torque from a source of torque, a rotary output member for providing drive torque to an output device and a torque transfer mechanism for transferring drive torque between the input member and the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electromagnet and a piston operable to supply pressurized fluid and provide the clutch engagement force.

18 Claims, 4 Drawing Sheets

U.S. PATENT DOCUMENTS

| | | |
|---|---|---|
| 6,745,879 B1 | 6/2004 | Dolan |
| 6,997,299 B2 * | 2/2006 | Brissenden et al. ........ 192/85 R |
| 7,021,445 B2 * | 4/2006 | Brissenden et al. ........ 192/85 R |
| 7,059,462 B2 * | 6/2006 | Brissenden et al. ........ 192/85 R |
| 7,097,019 B2 * | 8/2006 | Ronk et al. ................ 192/85 R |
| 7,201,266 B2 * | 4/2007 | Brissenden et al. ........ 192/85 R |
| 7,419,456 B2 * | 9/2008 | Knoblauch et al. ........ 192/85 C |
| 2005/0023102 A1 | 2/2005 | Brissenden et al. |
| 2005/0121283 A1 | 6/2005 | Brissenden et al. |
| 2006/0278493 A1 * | 12/2006 | Ronk et al. ................ 192/85 R |

FOREIGN PATENT DOCUMENTS

| | | |
|---|---|---|
| GB | 2 211 577 A | 7/1989 |
| JP | 2-18117 | 1/1990 |
| JP | 3066927 | 3/1991 |
| WO | WO 2004/051109 A1 * | 6/2004 |

* cited by examiner

CLUTCH CONTROL SYSTEM FOR POWER TRANSMISSION DEVICES

CROSS-REFERENCE TO RELATED APPLICATIONS

This application is a continuation of U.S. patent application Ser. No. 10/931,590 filed on Sep. 1, 2004.

FIELD OF THE INVENTION

The present invention relates generally to power transfer systems operable for controlling the distribution of drive torque between a pair of rotary shafts and, more particularly, to clutch control systems operable to efficiently convert electrical energy to mechanical potential energy for subsequent actuation of a clutch.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical mode shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the on-demand feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the normally non-driven wheels can be varied as a function of specific vehicle dynamics, as detected by the sensor arrangement.

Conventional clutch assemblies typically include a clutch pack operably connected between a drive member and a driven member. A power-operated actuator controls engagement of the clutch pack. Specifically, torque is transferred from the drive member to the driven member by actuating the power-operated actuator. The power-operated actuator displaces an apply plate which acts on the clutch pack and increases the frictional engagement between the interleaved plates.

A variety of power-operated actuators have been used in the art. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, includes a linear actuator that pivots a lever arm to regulate the frictional forces applied to the clutch pack. These types of systems are often equipped with motors that may require peak electrical currents greater than optimally desired to operate the clutch actuators. While the above actuator devices may perform adequately for their intended purpose, a need exists for an improved clutch actuation system that requires a relatively low, minimally fluctuating supply of electrical power for operation.

SUMMARY OF THE INVENTION

A power transmission device includes a rotary input member receiving drive torque from a source of torque, a rotary output member for providing drive torque to an output device and a torque transfer mechanism for transferring drive torque between the input member and the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electromagnet drivingly coupled to the hydraulic actuator. The hydraulic actuator includes a first piston biasedly engaged by a spring wherein the first piston is slidably positioned within a housing and operable to supply pressurized fluid to a second piston. Supply of pressurized fluid to the second piston provides the clutch engagement force.

BRIEF DESCRIPTION OF THE DRAWINGS

The present invention will become more fully understood from the detailed description given below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle. In operation, the amount of drive torque transferred to the non-driven wheels is controllably regulated in accordance with various system and driver-initiated inputs for optimizing the tractive characteristics of the vehicle. In addition, the power transfer system may also include a mode select mechanism for permitting a vehicle operator to select between a two-drive wheel mode, a part-time four-wheel drive mode, and an "on-demand" drive mode. The power transfer system of the present invention includes a clutch control system for converting electrical energy to mechanical potential energy to alleviate exceedingly high peak electrical current requirements that may occur during vehicle operation.

Figure 1:
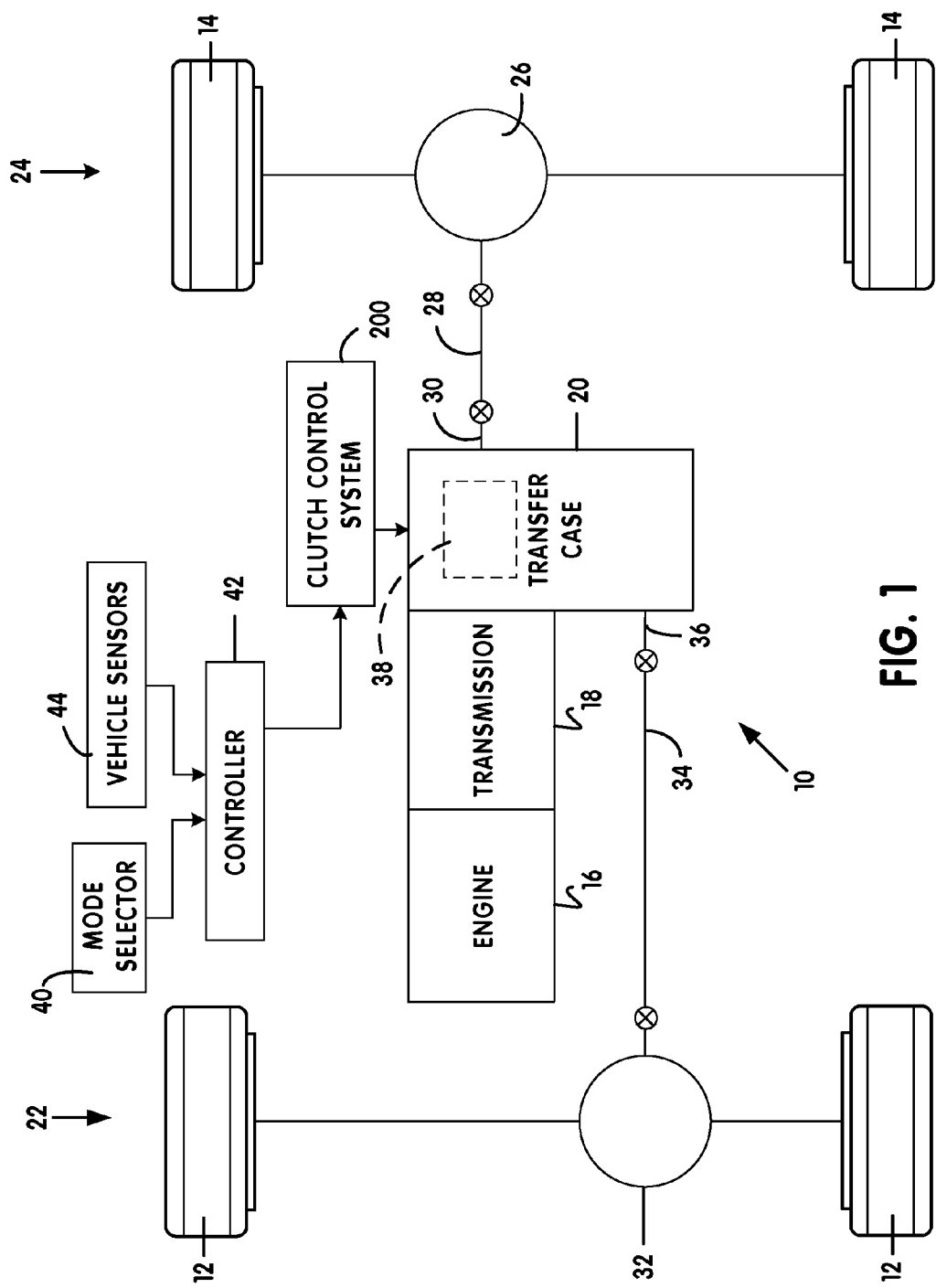
FIG. 1 is a schematic representation of an exemplary four-wheel drive vehicle having the clutch control systems of the present invention incorporated therein.

Referring to FIG. 1 of the drawings, a drivetrain for a four-wheel drive vehicle is schematically shown interactively associated with a power transfer system 10. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output shaft 30 of transfer case 20. Similarly, front axle assembly 22 includes a front differential 32 that is coupled to one end of a front drive shaft 34, the opposite end of which is coupled to a second output shaft 36 of transfer case 20. It is to be understood that the specific orientation of the drivetrain is merely exemplary in nature and that the drivetrain could be reversed for normally driving front wheels 12.

Transfer case 20 is equipped with a torque transfer clutch 38 for selectively delivering drive torque to front wheels 12 (i.e., the non-driven wheels) to establish a four-wheel drive mode of operation. The operating mode of transfer clutch 38 is generally controlled in response to a mode signal generated by a mode selector 40 and which is sent to a controller 42. Controller 42 also receives input signals from one or more vehicle sensors 44 that are indicative of various operational characteristic of the vehicle.

When the two-wheel drive mode is selected, all drive torque is delivered from first output shaft 30 to rear wheels 14 and transfer clutch 38 is maintained in a "non-actuated" condition. When the part-time four-wheel drive mode is selected, transfer clutch 38 is fully actuated and maintained in a "lock-up" condition such that second output shaft 36 is, in effect, rigidly coupled for driven rotation with first output shaft 30. When the "on-demand" drive mode is selected, controller 42 communicates with a clutch control system 200 to control the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated state of transfer clutch 38 as described in greater detail hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

Figure 2:
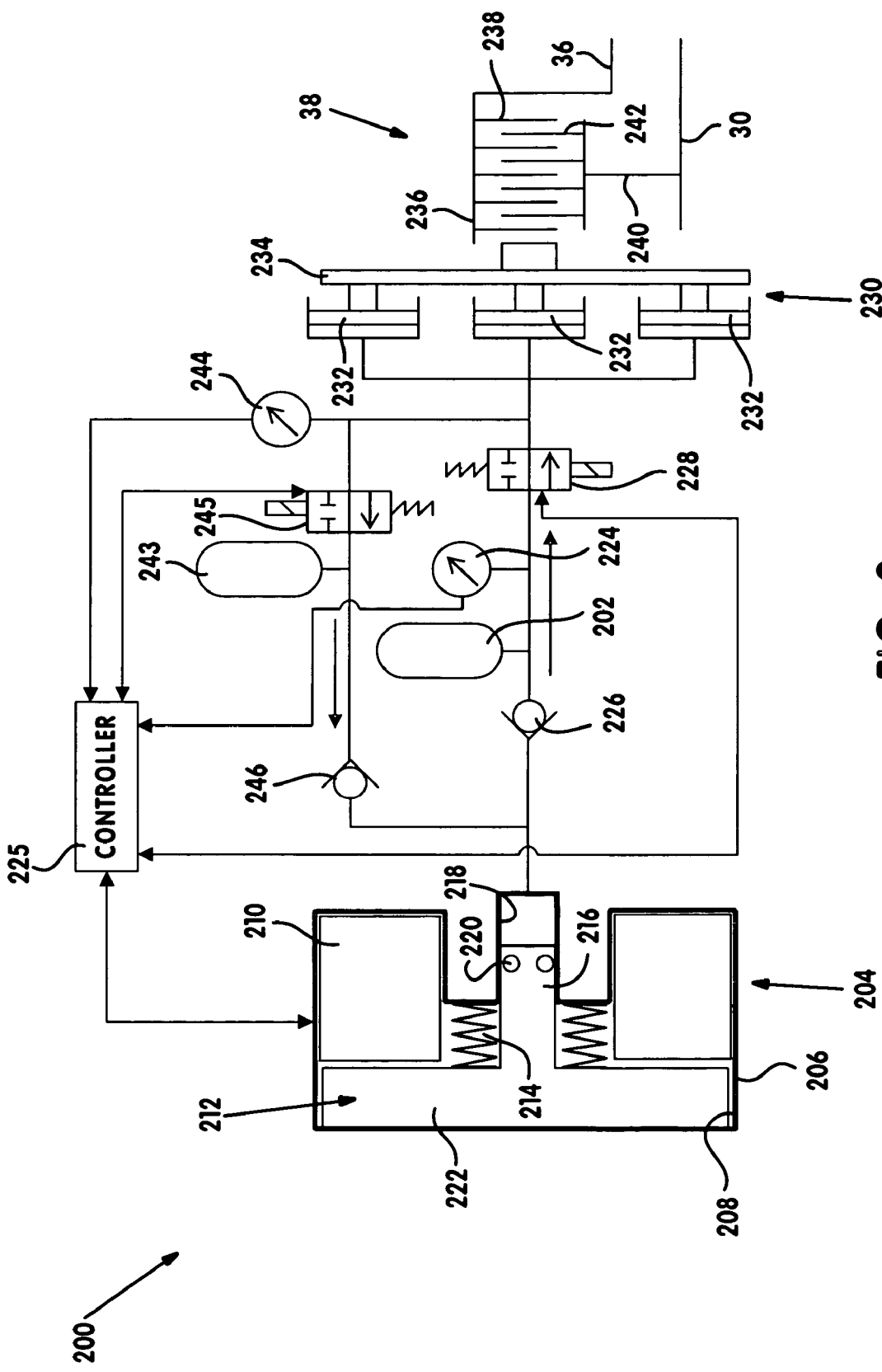
FIG. 2 is a schematic representation of a first embodiment clutch actuation system.
Figure 3:
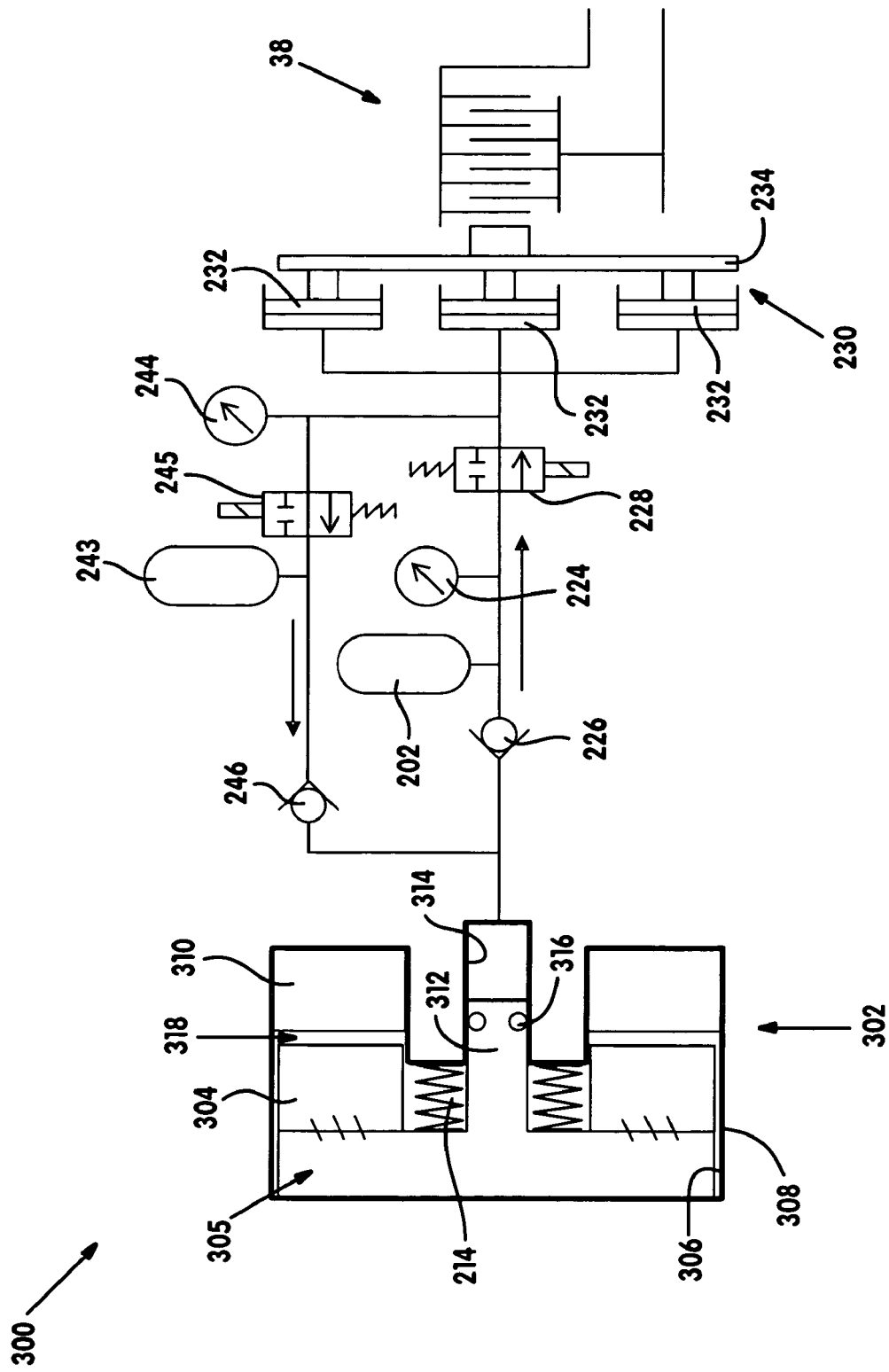
FIG. 3 is a schematic representation of an alternate embodiment clutch actuation system.
Figure 4:
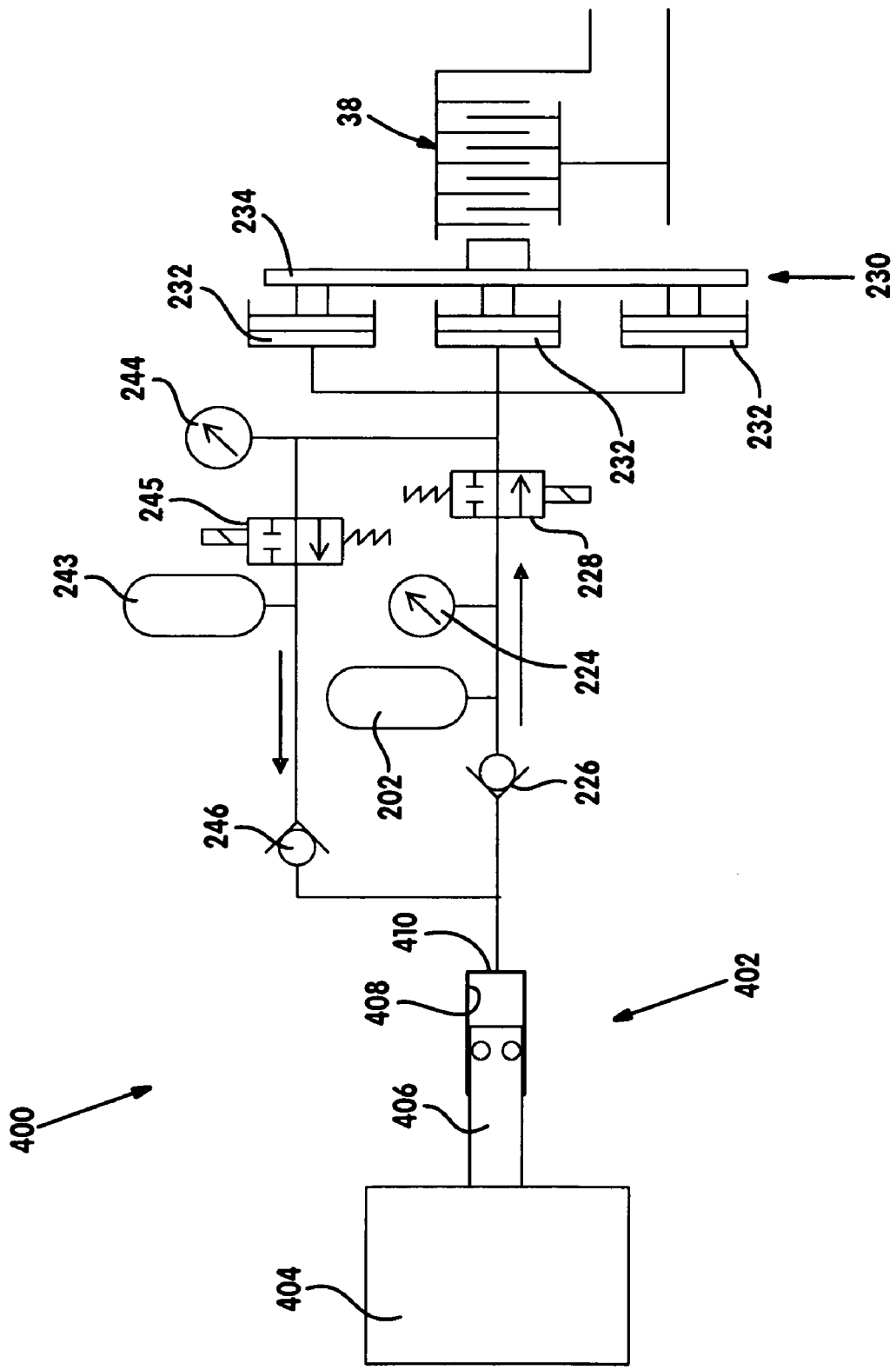
FIG. 4 is a schematic representation of an alternate embodiment clutch actuation system.

FIGS. 2-4 depict various clutch control systems for storing mechanical energy and reducing the maximum required electrical current for clutch actuation. The clutch control systems discussed below are an improvement over prior systems due to their ability to reduce peak power draw and overall power consumption from the vehicle's electrical system while operating the modulating clutch. The decrease in power draw is primarily accomplished by using a relatively low amount of electrical energy over time to charge a mechanical energy storage device and releasing the energy rapidly when required. This control scheme makes it possible to reduce the size of vehicle electrical system including the wires and circuitry controlling the electrical system. Each of the clutch control systems described below provides for operating a modulating clutch or clutches. The controls for the modulating clutches utilize available vehicle information along with hydraulic system information to react to a vehicle command to provide the required torque and/or speed.

The first exemplary embodiment clutch control system 200 is depicted in FIG. 2. Clutch control system 200 includes an accumulator 202 as an energy storage device. Accumulator 202 may be of the gas or spring type. Clutch control system 200 also includes a hydraulic actuator 204 in communication with accumulator 202. Hydraulic actuator 204 is operable to provide intermittent pulses of highly pressurized fluid to accumulator 202 to store mechanical potential energy in the accumulator.

Hydraulic actuator 204 includes a housing 206 defining a cavity 208, an electromagnet 210 and a master piston 212 slidably positioned within cavity 208 of housing 206. Electromagnet 210 is positioned within housing 206. A spring 214 interconnects master piston 212 and housing 206 to biasedly urge master piston 212 toward a retracted position shown in FIG. 2.

Master piston 212 includes a stem portion 216 slidably positioned within a hydraulic cavity 218 formed within housing 206. A seal 220 sealingly engages stem portion 216 and housing 206 to allow a relatively high pressure to be generated within hydraulic cavity 218. Master piston 212 is preferably constructed from a magnetizable material such that energization of electromagnet 210 attracts a body portion 222 of master piston 212 toward electromagnet 210.

Hydraulic actuator 204 may be operated as a pump by alternately supplying and disconnecting power to electromagnet 210. When the electromagnet is powered, body portion 222 of master piston 212 is attracted toward electromagnet 210. When body portion 222 contacts electromagnet 210, piston 212 is in the advanced position. During this operation, stem portion 216 axially translates in an advancing direction to supply pressurized fluid to accumulator 202. Once body portion 222 contacts electromagnet 210, power is discontinued to the electromagnet. Spring 214 forces master piston 212 toward the retracted position shown in FIG. 2.

Clutch control system 200 also includes a first pressure sensor 224 in communication with accumulator 202. First pressure sensor 224 is operable to provide a signal indicative of the fluid pressure within accumulator 202 to a controller 225. It should be appreciated that controller 225 may be a stand alone unit or may be incorporated as part of controller 42. A non-returning check valve 226 is plumbed between cavity 218 and accumulator 202 to allow pressurized fluid to enter the accumulator but restrict flow from the accumulator toward the pressurized fluid source. A first control valve 228 is operable to selectively supply pressurized fluid within accumulator 202 to a clutch actuator assembly 230. Depending on system requirements, first control valve 228 may be a variable force solenoid, a pulse width modulation control valve, a proportional flow control valve or a proportional pressure control valve. Clutch actuator assembly 230 includes a plurality of slave pistons 232 substantially circumferentially spaced apart from one another and in communication with an apply plate 234. Apply plate 234 is axially moveable and operable to transmit a clutch engagement force to transfer clutch 38.

Transfer clutch 38 is a multi-plate clutch assembly that is arranged to transfer torque between first output shaft 30 and second output shaft 36. Transfer clutch 38 includes a cylindrical drum 236 shown to be operably fixed for rotation with second output shaft 36 and having a plurality of first or outer clutch plates 238 mounted (i.e., splined) for rotation with drum 236. A clutch hub 240 of transfer clutch 38 is fixed for rotation with first output shaft 30. A second set of clutch plates 242, referred to as inner clutch plates, are mounted (i.e., splined) for rotation with clutch hub 240. Torque is transferred between first output shaft 30 and second output shaft 36 by frictionally engaging first clutch plates 238 with second clutch plates 242 with a compression force supplied by apply plate 234.

Slave pistons 232 are slidably engageable with apply plate 234 and transmit a force proportional to the pressure acting on each of slave pistons 232. A second pressure sensor 244 is plumbed in communication with slave pistons 232. Second pressure sensor 244 is operable to output a signal indicative of the fluid pressure acting on slave pistons 232. The signal is provided to controller 225 and used as a feedback signal to control the torque generated by transfer clutch 38. A second control valve 245 is operable to selectively supply pressurized fluid acting on slave pistons 232 to a second accumulator 243. Second accumulator 243 contains fluid at a substantially lower pressure than accumulator 202. Pressure acting on slave pistons 232 may be selectively released to second accumulator 223 by actuating second control valve 245.

An optional second non-returning check valve 246 acts as a pressure relief valve to allow fluid previously acting on slave pistons 232 to return to cavity 218. One skilled in the art will appreciate that clutch control system 200 is a closed hydraulic system. Accordingly, fluid need not be continually supplied to clutch control system 200 once the system has been initially filled with hydraulic fluid. An account for fluid leakage may be made as will be described.

In operation, clutch control system 200 operates to charge accumulator 202 with fluid at a relatively high pressure by operating hydraulic actuator 204 and energizing electromagnet 210 to translate stem portion 216 in an advancing direction. Electromagnet 210 generates enough force to overcome the force generated by spring 214 and pressurize fluid within cavity 218. Pressurized fluid passes through non-returning check valve 226 and enters accumulator 202. During the accumulator charging cycle, first control valve 228 is closed. If clutch control system 200 is not equipped with a second non-returning check valve, second control valve 245 is also maintained in the closed position to charge accumulator 202.

Once master piston 212 is in the advanced position, the power supply to electromagnet 210 is discontinued. Spring 214 forces master piston 212 to the retracted position. The pumping or charging sequence is continued until a desired pressure within accumulator 202 is reached as indicated by a signal output from first pressure sensor 224. It should be appreciated that hydraulic actuator 204 may produce a maximum desired pressure while requiring minimal current from the vehicle power source.

Once the desired pressure is stored in accumulator 202 the charging cycle is discontinued. At this time, clutch control system 200 awaits a torque demand signal. Upon receipt of a signal for torque from controller 225, first control valve 228 is opened to supply pressurized fluid to slave pistons 232. The signal output from second pressure sensor 244 indicates the pressure acting upon slave pistons 232 and may be correlated to torque generated by transfer clutch 38. If a reduction in output torque from transfer clutch 38 is desired, second control valve 245 is allowed to shift to its normally open position thereby releasing pressurized fluid into low pressure accumulator 243 and reduce the pressure acting upon slave pistons 232.

In an alternate form, clutch control system 200 may be equipped with an alternate second control valve (not shown) that operates as a normally closed valve as opposed to the normally open configuration shown in FIG. 2. If second control valve 245 is a normally closed valve, leakage of fluid past first control valve 228 may cause transfer clutch 38 to be in an applied condition during vehicle inoperative times. Some Original Equipment Manufacturers may not wish this condition and specify the normally open second control valve. Furthermore, any number of the valves presently depicted may be plumbed as normally or normally closed valves to meet vehicle manufacturer requirements.

FIG. 3 depicts an alternate embodiment clutch control system 300. Clutch control system 300 is a closed system similar to the clutch control system previously discussed. Like elements will retain the reference numerals previously introduced. Clutch control system 300 includes an actuator 302 that functions substantially similarly to hydraulic actuator 204. However, actuator 302 includes a first magnet 304 coupled to a master piston 305. The first electromagnet and master piston subassembly is slidably positioned within a cavity 306 of a housing 308. A second electromagnet 310 is also positioned within cavity 306. Second electromagnet 310 is fixed to housing 308. Master piston 305 includes a stem portion 312 operably acting on hydraulic fluid contained within a hydraulic cavity 314 of housing 308. A seal 316 sealingly engages stem portion 312 and cavity 314 to maintain a closed hydraulic system.

A gap 318 exists between first electromagnet 304 and second electromagnet 310 when master piston 305 is in the retracted position as shown in FIG. 3. As mentioned earlier, spring 214 urges master piston 305 toward the retracted position. When the first and second electromagnets are energized, the first electromagnet and master piston subassembly is attracted to second electromagnet 310. During this operation, stem portion 312 forces pressurized hydraulic fluid past non-returning check valve 226 into accumulator 202. When first electromagnet 304 contacts second electromagnet 310, the first electromagnet master piston subassembly is in the advanced position. Power is discontinued to each of the electromagnets and spring 214 forces master piston 305 back to the retracted position once again. In this manner, actuator 302 may act as a pump to provide pressurized fluid to accumulator 202. It should be appreciated that the remaining components of clutch control system 300 and their operation are substantially similar to the components previously described in relation to clutch control system 200. Accordingly, a redundant description will not be provided.

FIG. 4 depicts an alternate embodiment clutch control system 400 operable for selectively supplying an actuation force to transfer clutch 38. Clutch control system 400 is substantially similar to clutch control system 300 previously described. For clarity, like elements will retain their previously introduced reference numerals.

Clutch control system 400 includes an actuator 402 that functions substantially similarly to hydraulic actuators 204 and 302 previously described. However, actuator 402 includes a spring return solenoid 404 coupled to a master piston 406. Master piston 406 is slidably positioned within a cavity 408 of a housing 410. Solenoid 404 includes a return spring (not shown) operable to return master piston 406 to a retracted position as depicted in FIG. 4. Energization of solenoid 404 causes master piston 406 to translate in an advancing direction. As master piston 406 translates, pressurized fluid is supplied to accumulator 202. At the end of the stroke of master piston 406, power is no longer supplied to solenoid 404 and the internal return spring retracts master piston 406. This sequence of events is repeated to pump highly pressurized fluid into accumulator 202. Other components of clutch control system 400 function substantially similarly to those previously described.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A clutch control system for controlling actuation of a clutch, comprising:
   an accumulator;
   a hydraulic actuator having a first piston disposed in a first pressure chamber and an electrically-powered device operable for controlling movement of said first piston to supply pressurized fluid from said first pressure chamber to said accumulator;
   a clutch actuator having a second piston disposed in a second pressure chamber and operable to engage the clutch;
   a first control valve operable for controlling delivery of pressurized fluid from said accumulator to said second pressure chamber; and
   a second control valve operable for controlling delivery of pressurized fluid from said second pressure chamber to said first pressure chamber.

2. The clutch control system of claim 1 wherein said accumulator and said first control valve are disposed in a first fluid pathway between said first pressure chamber and said second pressure chamber, and wherein said second control valve is disposed in a second fluid pathway between said second pressure chamber and said first pressure chamber.

3. The clutch control system of claim 1 further comprising a Controller operable for controlling actuation of said electrically-powered device and said first and second control valves.

4. The clutch control system of claim 3 further comprising a first pressure sensor operable for providing said controller with a first pressure signal indicative of the fluid pressure in said accumulator and a second pressure sensor operable for providing said controller with a second pressure signal indicative of the fluid pressure in said second pressure chamber.

5. The clutch control system of claim 1 further comprising a second accumulator operably disposed between said second control valve and said first pressure chamber.

6. The clutch control system of claim 1 wherein said electrically-powered device is an electromagnet.

7. A hydraulic clutch actuation system for applying a clutch engagement force to a friction clutch, said hydraulic clutch actuation system including an actuator, an accumulator operable to store pressurized fluid supplied by said actuator and a delivery system for selectively providing pressurized fluid from said accumulator to actuate the friction clutch, said actuator having an electromagnet with an aperture extending therethrough and a first piston slidably positioned within a first pressure chamber, said first piston including an enlarged body portion positioned adjacent to an end of the electromagnet outside of the aperture and a stem portion extending through the aperture, said body portion being biased toward a retracted position by a spring and selectively moveable toward an advanced position via energization of said electromagnet, said actuator being operable to supply pressurized fluid to said accumulator for use in generating the clutch engagement force applied to the friction clutch, and wherein said delivery system includes a second piston slidably positioned in a second pressure chamber, a first valve for selectively supplying fluid pressure from said accumulator to said second pressure chamber for causing said second piston to apply the clutch engagement force to the friction clutch, and a second valve for selectively coupling said second pressure chamber to a second accumulator so as to release fluid pressure in said second pressure chamber for reducing the clutch engagement force applied to the friction clutch.

8. The hydraulic clutch actuation system of claim 7 further including a controller and a pressure sensor operable to provide said controller with a signal indicative of a fluid pressure within said second pressure chamber.

9. The hydraulic clutch actuation system of claim 8 wherein said controller is operable to actuate said first valve and said second valve for maintaining a desired pressure within said second pressure chamber.

10. A power transmission device comprising:
    first and second rotary members;
    a friction clutch operably disposed between said first and second rotary members; and
    a hydraulic clutch actuation system operable for applying a clutch engagement force to said friction clutch, said hydraulic clutch actuation system including an actuator having first and second electromagnets operable to translate a piston from a retracted position to an advanced position and an accumulator for storing pressurized fluid supplied by said actuator, said piston being fixed to said first electromagnet and operable to supply pressurized fluid to said accumulator for use in actuating said friction clutch.

11. The power transmission device of claim 10 wherein said hydraulic clutch actuation system includes a delivery system for selectively providing pressurized fluid from said accumulator to a second piston that is operable to provide said clutch engagement force.

12. The power transmission device of claim 11 wherein said delivery system includes a first valve for selectively fluidly coupling said accumulator to said second piston.

13. The power transmission device of claim 12 wherein said hydraulic clutch actuation system includes a second valve for selectively coupling a pressure chamber containing said second piston with said accumulator, said second valve being operable to release pressure in said pressure chamber for reducing said clutch engagement force applied to said friction clutch.

14. The power transmission device of claim 10 wherein said piston includes an enlarged body portion fixed to said first electromagnet and a stem portion passing through apertures formed in the first and second electromagnets.

15. A hydraulic clutch actuation system operable for engaging a friction clutch to transfer drive torque between first and second rotary members and including a hydraulic actuator, an accumulator, a clutch actuator and a control system, said hydraulic actuator having a first piston disposed in a first pressure chamber and an electrically-powered device for controlling movement of said first piston to supply pressurized fluid from said first pressure chamber to said accumulator, said clutch actuator having a second piston disposed in a second pressure chamber and operable to apply a clutch engagement force on the friction clutch, and said control system includes a control valve for controlling the delivery of pressurized fluid from said accumulator to said second pressure chamber and a second control valve for controlling the delivery of pressurized fluid from said second pressure chamber to a second accumulator.

16. The hydraulic clutch actuation system of claim 15 wherein said control system further includes a controller operable for controlling actuation of said electrically-powered device, said first control valve and said second control valve.

17. The hydraulic clutch actuation system of claim 16 further including a first pressure sensor operable for providing said controller with a first pressure signal indicative of the fluid pressure in said first accumulator and a second pressure sensor operable for providing said controller with a second pressure signal indicative of the fluid pressure in said second pressure chamber.

18. The hydraulic clutch actuation system of claim 16 wherein said controller is operable to control actuation of an electromagnet to move said first piston within said first pressure chamber between first and second positions to maintain said fluid pressure within said accumulator within a desired range.

* * * * *

UNITED STATES PATENT AND TRADEMARK OFFICE
CERTIFICATE OF CORRECTION

| | | |
|---|---|---|
| PATENT NO. | : 7,588,133 B2 | Page 1 of 1 |
| APPLICATION NO. | : 11/507315 | |
| DATED | : September 15, 2009 | |
| INVENTOR(S) | : Ronk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this

Twenty-first Day of September, 2010

David J. Kappos
*Director of the United States Patent and Trademark Office*